United States Patent
Metternich et al.

(10) Patent No.: US 10,267,523 B2
(45) Date of Patent: Apr. 23, 2019

(54) COMBUSTOR DOME DAMPER SYSTEM

(71) Applicant: ANSALDO ENERGIA IP UK LIMITED, London (GB)

(72) Inventors: Jeremy Metternich, Wellington, FL (US); Mirko R. Bothien, Zurich (CH); Khalid Oumejjoud, Palm Beach Gardens, FL (US); Dwain P. Terrell, Jupiter, FL (US)

(73) Assignee: ANSALDO ENERGIA IP UK LIMITED (GB)

(*) Notice: Subject to any disclaimer, the term of this patent is extended or adjusted under 35 U.S.C. 154(b) by 342 days.

(21) Appl. No.: 14/486,289

(22) Filed: Sep. 15, 2014

(65) Prior Publication Data

US 2016/0076772 A1    Mar. 17, 2016

(51) Int. Cl.
| | |
|---|---|
| F02C 7/24 | (2006.01) |
| F23R 3/18 | (2006.01) |
| F23R 3/28 | (2006.01) |
| F23R 3/26 | (2006.01) |
| F01N 1/02 | (2006.01) |
| F23R 3/00 | (2006.01) |

(52) U.S. Cl.
CPC .............. *F23R 3/18* (2013.01); *F01N 1/023* (2013.01); *F02C 7/24* (2013.01); *F23R 3/002* (2013.01); *F23R 3/26* (2013.01); *F23R 3/28* (2013.01); *F05D 2260/963* (2013.01); *F05D 2260/964* (2013.01); *F23R 2900/00013* (2013.01); *F23R 2900/00014* (2013.01)

(58) Field of Classification Search
CPC ........................................................ F23R 3/18
See application file for complete search history.

(56) References Cited

U.S. PATENT DOCUMENTS

| | | | | |
|---|---|---|---|---|
| 5,644,918 | A * | 7/1997 | Gulati | F23R 3/002 431/114 |
| 7,513,115 | B2 * | 4/2009 | Stuttaford | F23D 14/82 431/346 |

(Continued)

FOREIGN PATENT DOCUMENTS

| | | |
|---|---|---|
| CN | 101680663 A | 3/2010 |
| CN | 103672964 A | 3/2014 |

(Continued)

OTHER PUBLICATIONS

Search Report from Corresponding Chinese Application No. 201580061884.4 dated Oct. 28, 2018 (3 pages).

(Continued)

*Primary Examiner* — William H Rodriguez
*Assistant Examiner* — Kyle Robert Thomas
(74) *Attorney, Agent, or Firm* — Hovey Williams LLP

(57) ABSTRACT

The present invention discloses a novel apparatus and way for controlling combustion dynamics in a premix combustion system. The apparatus comprises a hemispherical dome assembly with a plurality of dome dampers having a predetermined damper volume and air supply with the damper in fluid communication with the combustion chamber. The dome dampers are pressurized with a volume of air to dampen pressure waves received from the combustion chamber. One or more combustor frequencies can be targeted through use of the present invention.

17 Claims, 24 Drawing Sheets

(56) References Cited

U.S. PATENT DOCUMENTS

| | | | | |
|---|---|---|---|---|
| 2008/0087019 A1* | 4/2008 | Macquisten | ............ | F23R 3/002 60/725 |
| 2008/0216481 A1* | 9/2008 | Pollarolo | .................. | F23R 3/50 60/725 |
| 2008/0295519 A1* | 12/2008 | Park | ......................... | F23R 3/28 60/740 |
| 2011/0138812 A1* | 6/2011 | Johnson | .................... | F23R 3/00 60/725 |
| 2011/0179796 A1* | 7/2011 | Magni | ...................... | F23R 3/00 60/725 |
| 2014/0060063 A1* | 3/2014 | Boardman | .............. | F23R 3/286 60/772 |
| 2014/0069738 A1 | 3/2014 | Bothien et al. | | |

FOREIGN PATENT DOCUMENTS

| | | |
|---|---|---|
| CN | 103672971 A | 3/2014 |
| EP | 2397759 A1 | 12/2011 |

OTHER PUBLICATIONS

English Translation of Search Report from Corresponding Chinese Application No. 201580061884.4 dated Oct. 28, 2018 (3 pages).
Office Action issued in Corresponding Chinese Application No. 201580061884.4 dated Nov. 5, 2018 (8 pages).
English Translation of Office Action issued in Corresponding Chinese Application No. 201580061884.4 dated Nov. 5, 2018 (10 pages).

* cited by examiner

COMBUSTOR DOME DAMPER SYSTEM

CROSS-REFERENCE TO RELATED APPLICATIONS

Not applicable.

TECHNICAL FIELD

The present invention relates generally to an apparatus and method for controlling the combustion dynamics in a gas turbine combustion system. More specifically, a combustion system is provided having a combustor dome and a plurality of dome damper mechanisms for reducing the pressure fluctuations within the combustion system.

BACKGROUND OF THE INVENTION

In an effort to reduce the amount of pollution emissions from gas-powered turbines, governmental agencies have enacted numerous regulations requiring reductions in the amount of oxides of nitrogen (NOx) and carbon monoxide (CO). Lower combustion emissions can often be attributed to a more efficient combustion process, with specific regard to fuel injector location, airflow rates, and mixing effectiveness.

Early combustion systems utilized diffusion type nozzles, where fuel is mixed with air external to the fuel nozzle by diffusion, proximate the flame zone. Diffusion type nozzles historically produce relatively high emissions due to the fact that the fuel and air burn essentially upon interaction, without mixing, and stoichiometrically at high temperature to maintain adequate combustor stability and low combustion dynamics.

An enhancement in combustion technology is the concept of premixing fuel and air prior to combustion to form a homogeneous mixture that burns at a lower temperature than a diffusion type flame and thereby produces lower NOx emissions. Premixing can occur either internal to the fuel nozzle or external thereto, as long as it is upstream of the combustion zone. An example of a premixing combustor has a plurality of fuel nozzles, each injecting fuel into a premix chamber where fuel mixes with compressed air from a plenum before entering a combustion chamber. Premixing fuel and air together before combustion allows for the fuel and air to form a more homogeneous mixture, which, when ignited will burn more completely, resulting in lower emissions. However, due to the mixing and combustion processes inherent in a premixing combustor, the pressures within the combustion system will fluctuate and varying pressure fluctuations can cause damage to the combustion hardware if not adequately controlled.

SUMMARY

The present invention discloses an apparatus and method for reducing the combustion dynamics in a multi-staged premix gas turbine combustor. More specifically, in an embodiment of the present invention, a dome assembly for a gas turbine combustor is provided having a dome plate with a generally hemispherical cross section, a plurality of openings in the dome plate, and a plurality of dome dampers, each encompassing a respective opening. The dome dampers comprise a damper body having a cavity, a removable coverplate secured to the end of a damper, and a plurality of pure holes located about the damper body.

In an alternate embodiment of the present invention, a gas turbine combustion system is disclosed comprising a generally cylindrical combustion liner located radially within a flow sleeve, and a set of main fuel injectors positioned radially outward of the combustion for directing a flow of fuel to mix with air to enter the combustion liner. A combustor dome assembly encompasses the inlet end of the combustion liner and has a dome plate with a generally hemispherical cross section, a plurality of openings in the dome plate, and a plurality of dome dampers, each encompassing a respective opening. Each of the dampers has a damper body and a removable coverplate secured thereto to form a damper volume and purge holes located in the damper body.

In yet another embodiment of the present invention, a method of regulating combustion dynamics in a gas turbine combustor is provided. The method comprises providing a combustion system having a combustor dome in which a plurality of openings are present, each of the openings surrounded by a dome damper. One or more of the desired frequencies to control is determined and a volume required to target the one or more desired combustion frequencies is then determined. A desired amount of purge air flow to pass into the plurality of dampers is determined and a coverplate is secured to an end of each dome damper where the coverplate helps to form a desired volume within each damper, where the desired volume is sufficient in size to adequately dampen pressure fluctuations in the combustion system.

In a further embodiment of the present invention, a dome assembly for a gas turbine combustor is provided having a dome plate with a generally hemispherically-shaped cross section, an adapter plate positioned adjacent to the dome plate, one or more resonator boxes, extending from the adapter plate and a plurality of dome dampers.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The present invention discloses a dome assembly for gas turbine combustion system for use in a premix combustion system to help reduce combustion dynamics and is shown in detail in FIGS. 1-26. As one skilled in the art understands, a gas turbine engine typically incorporates a plurality of combustors. Generally, for the purpose of discussion, the gas turbine engine may include low emission combustors such as those disclosed herein and may be arranged in a can-annular configuration about the gas turbine engine. One type of gas turbine engine (e.g., heavy duty gas turbine engines) may be typically provided with, but not limited to, six to eighteen individual combustors, each of them fitted with the components outlined above. Accordingly, based on the type of gas turbine engine, there may be several different fuel circuits utilized for operating the gas turbine engine.

Figure 1:
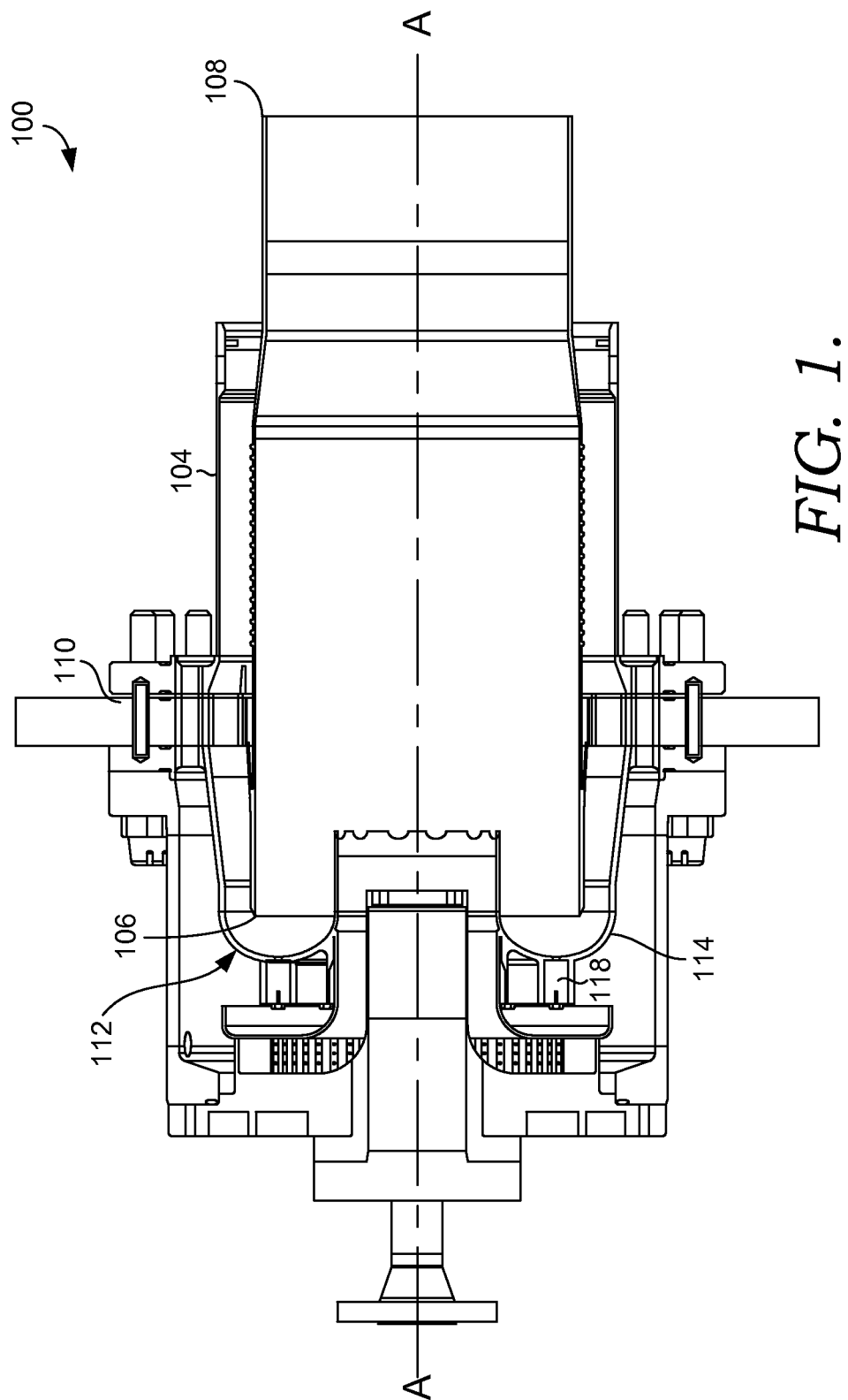
FIG. 1 is a cross section of a gas turbine combustion system in accordance with an embodiment of the present invention.

Referring specifically to FIG. 1, a gas turbine combustion system 100 in accordance with an embodiment of the present invention is shown in cross section. The gas turbine combustion system 100 comprises a generally cylindrical combustion liner 102 having a central axis A-A and located coaxial to and radially within a flow sleeve 104. The combustion liner 102 has an inlet end 106 and an opposing outlet end 108.

The gas turbine combustion system 100 also comprises a set of main fuel injectors 110 positioned radially outward of the combustion liner 102 and proximate an upstream end of the flow sleeve 104. The combustion system 100 disclosed in FIG. 1 is a multi-stage premixing combustion system comprising four stages of fuel injection based on the loading of the engine. However, it is envisioned that the specific fuel circuitry and associated control mechanisms could be modified to include fewer or additional fuel circuits.

For the embodiment of the present invention shown in FIG. 1, the main fuel injectors 110 are located radially outward of the combustion liner 102 and spread in an annular array about the combustion liner 102. The main fuel injectors 110 are divided into two stages with a first stage extending approximately 120 degrees about the combustion liner 102 and a second stage extending the remaining annular portion, or approximately 240 degrees, about the combustion liner 102. The first stage of the main fuel injectors 110 are used to generate a Main 1 flame in combustion liner 102 while the second stage of the main fuel injectors 110 generate a Main 2 flame in the combustion liner.

Figure 8:
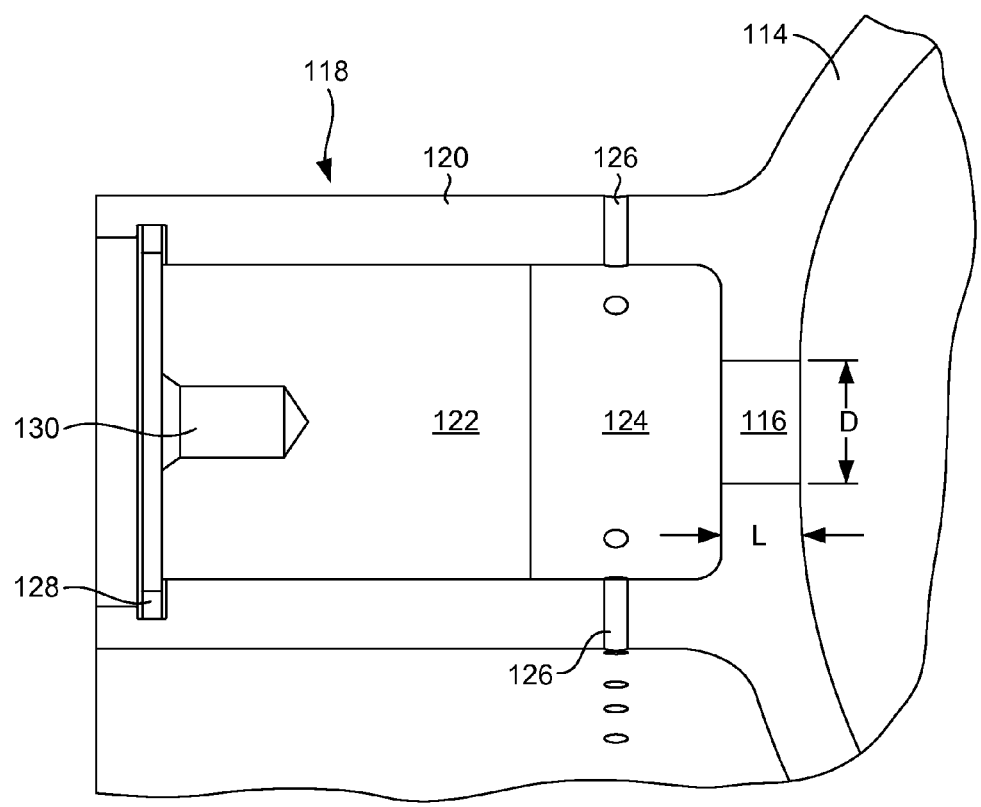
FIG. 8 is a detailed cross section view of a damper portion of the gas turbine combustor of FIG. 6 in accordance with an embodiment of the present invention.
Figure 9:
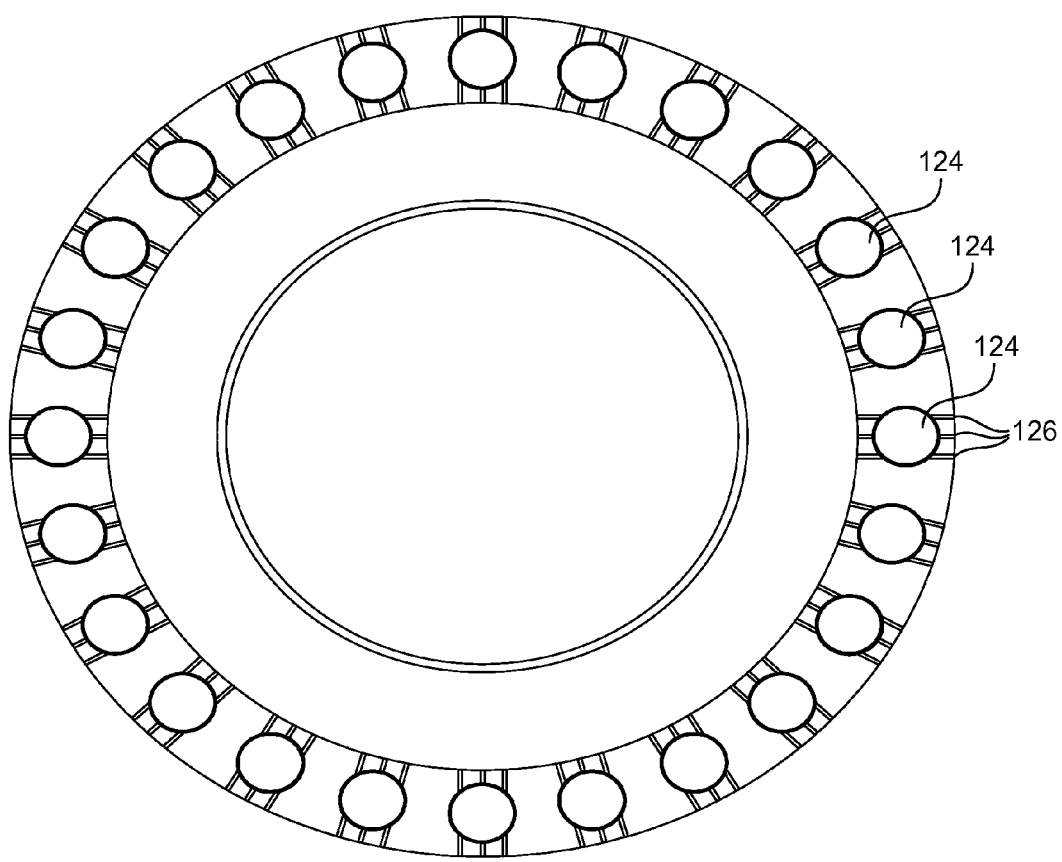
FIG. 9 is an alternate cross section taken through a portion of the gas turbine combustor depicted in FIG. 2 in accordance with an embodiment of the present invention.
Figure 10:
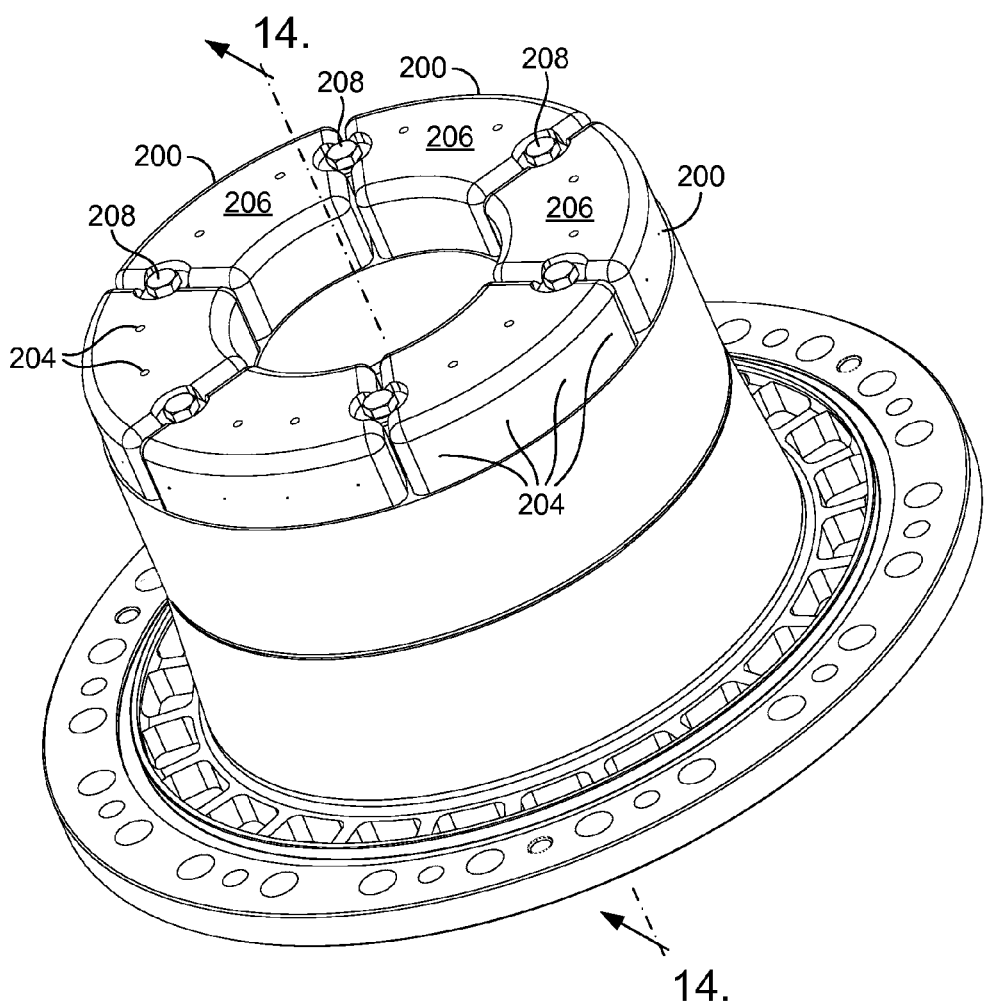
FIG. 10 is a perspective view of a portion of a gas turbine combustor in accordance with an alternate embodiment of the present invention.
Figure 11:
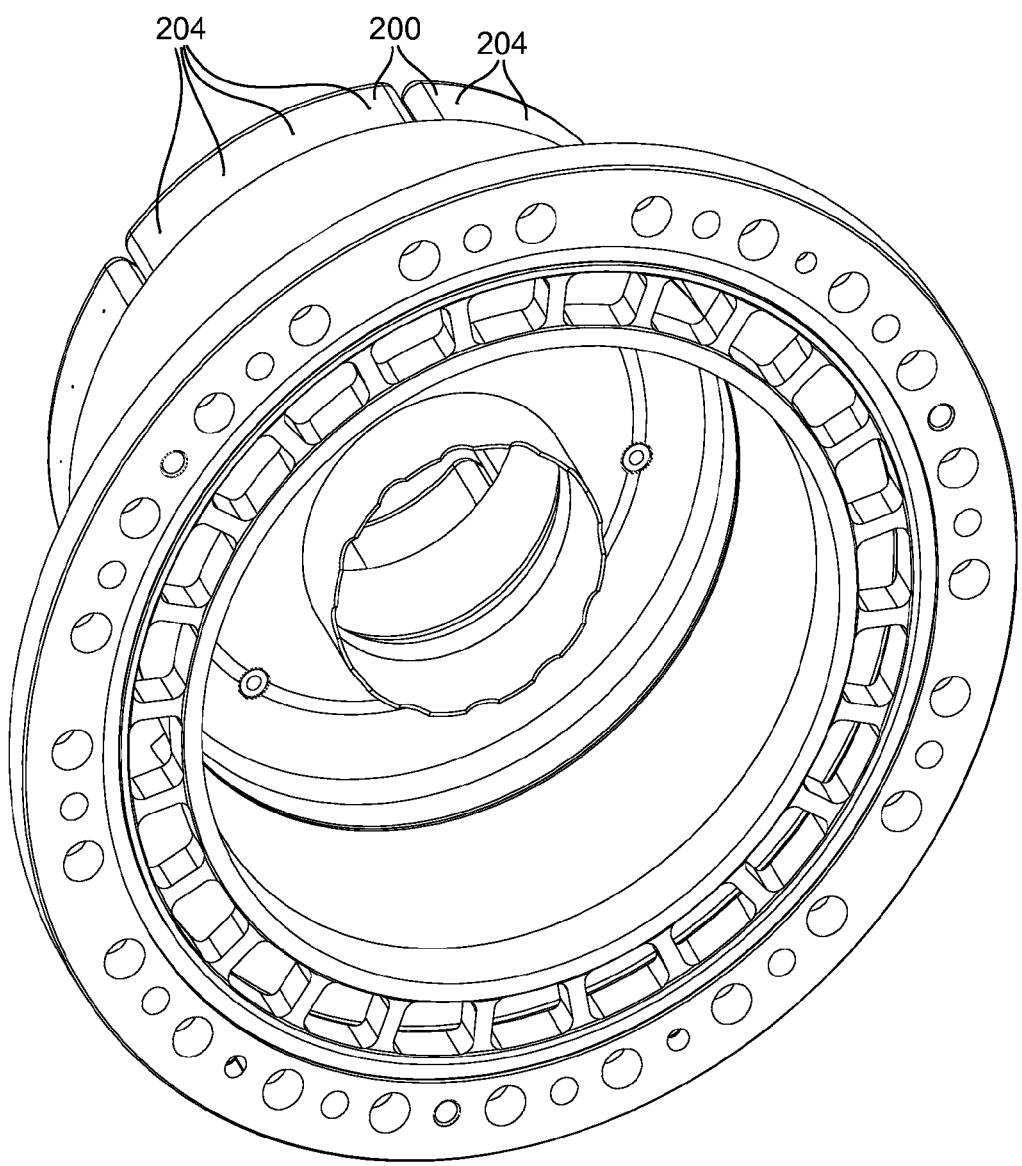
FIG. 11 is an alternate perspective view of a portion of the gas turbine combustor in accordance with the alternate embodiment of the present invention of FIG. 10.
Figure 12:
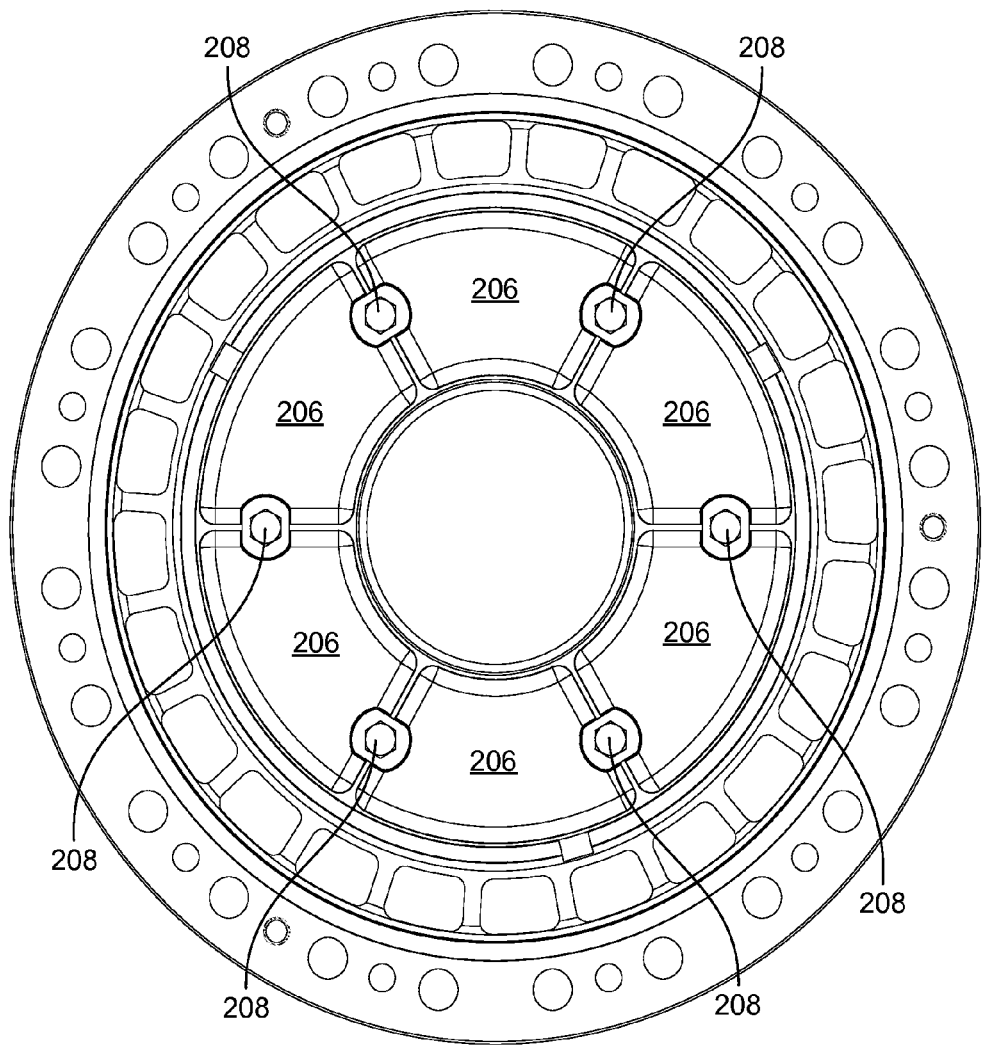
FIG. 12 an end view of a portion of the gas turbine combustor of FIG. 10 in accordance with an alternate embodiment of the present invention.
Figure 13:
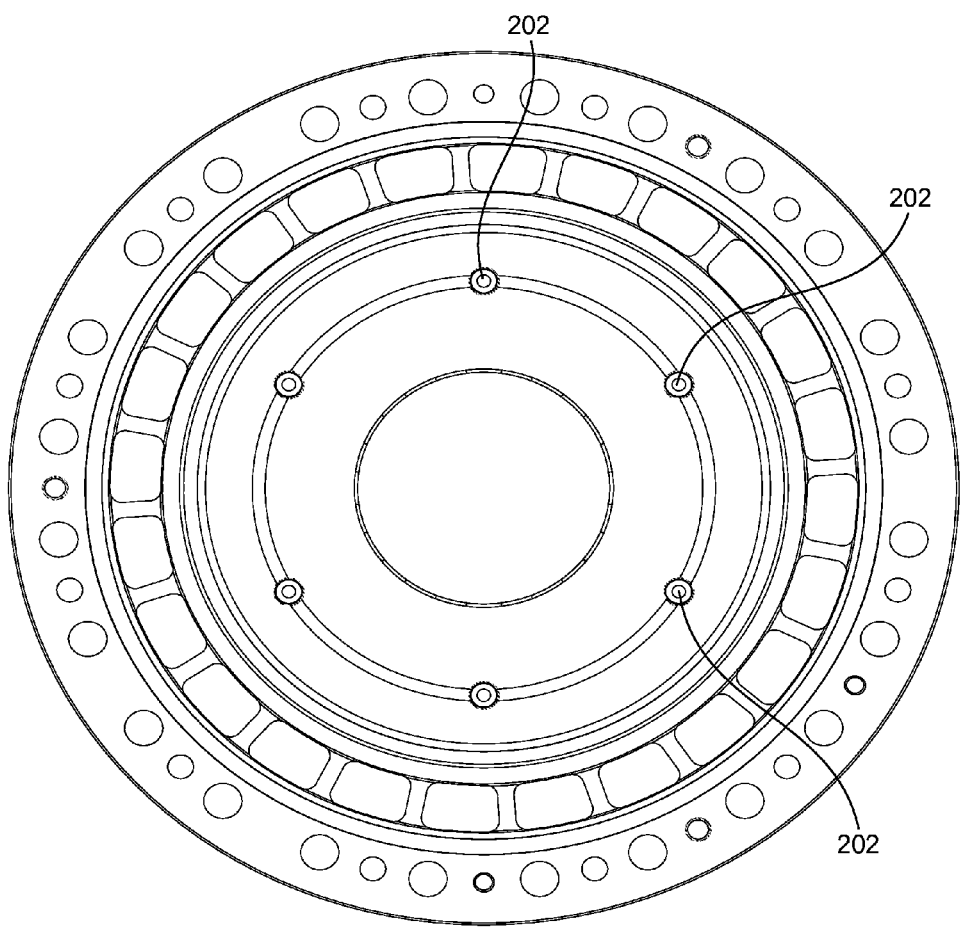
FIG. 13 is an opposing end view of the gas turbine combustor of FIG. 10 in accordance with an alternate embodiment of the present invention.

The gas turbine combustion system also comprises a combustor dome assembly 112 that encompasses the inlet end 106 of the combustion liner 102. The combustor dome assembly 112 extends from proximate the set of main fuel injectors 110 to a dome plate 114, where the dome plate 114 has a generally hemispherical-shaped cross section with the dome plate 114 positioned a distance forward of the inlet end 106 of the combustion liner 102 and turning to extend a distance into the combustion liner 102. The shape of the combustor dome assembly can also be seen in FIG. 6. Referring now to FIGS. 2-9, the combustor dome assembly 112 comprises a plurality of openings 116 in the dome plate 114, where each of the openings 116 has a diameter D and a neck length L. Preferably, the openings 116 have a circular cross section, but other shapes are also possible. The openings 116 are oriented in the dome plate 114 so as to preferably be parallel with a central axis A-A of the combustion system 100. Extending away from the dome plate 114, opposite of the combustion liner, is a plurality of dome dampers 118. Referring to FIG. 8, each of the dome dampers 118 encompasses one of the openings 116 and comprises a damper body 120 having an opening located therein. Accordingly, for the dome plate 114, the dome dampers 118 are oriented in an annular array about the central axis A-A of the combustion system 100. A removable cover plate 122 is secured to an end of the damper body 120 opposite of the opening 116 to form a damper volume 124. The damper body 120 also includes a plurality of purge holes 126.

The dome dampers 118 extend away from the combustion liner 102 in a way to establish predetermined volumes of air in order to provide a volume of air sufficient to dampen pressure fluctuations within the combustion liner 102. The dome dampers 118 are supplied with compressed air by way of purge holes 126, which, in an embodiment of the present invention are located along a side of the damper body 120 and are sized both in diameter and quantity to ensure a sufficient volume of compressed air is provided to the damper volume 124. The exact location and spacing of the purge holes 126 can vary. That is, the purge holes 126 may be located about the damper body 120 or the cover plate 122.

In operation, a pressure wave from the combustor travels upstream towards the dome plate 114, passes through the openings 116 in the dome plate 114, and into the damper volume 124 formed by the damper body 120 and cover plate 122. Once in the damper volume 124, the wave then encounters the volume of compressed air. The extra volume of air serves to generate a wave that is out of phase with an incoming wave, similar to how a spring and shock operate to counteract the movement of a motor vehicle. That is, the volume of air in the damper counteracts the pressure wave traveling up through the combustor.

As discussed above, the dome dampers 118 and corresponding damper volume 124 are sized to specifically target a particular resonance frequency for the damper in order to counteract a specific frequency or pressure oscillation in the combustion system. As one skilled in the art understands, the basic formula for resonance frequency of a damper is $f_{res} = c/2/\pi * \text{sqrt}(A_{neck}/L_{neck,eff}/V_{damper})$, where $f_{res}$ is the resonance frequency of the damper, c is the speed of sound, $A_{neck}$ is the cross sectional area of the opening 116 connecting the damping volume to the combustor, $L_{neck,eff}$ is the effective length L of the opening 116 and $V_{damper}$ is volume of the damper. Therefore, altering the cross sectional area of opening 116, its length L and the volume 124 can each affect the resonance frequency for the damper. For example, decreasing the volume of the damper increases the damper resonance frequency, while increasing the volume of the damper lowers the damper resonance frequency. Furthermore, the length L of the opening 116, or "neck" of the opening, can also vary. That is, if the length L of the neck region is increased, the resonance frequency of the damper decreases and if the length L of the neck region is decreased, the resonance frequency of the damper increases. A final variable for determining the resonance frequency of the damper is the area of the opening 116. If the area of opening 116 is increased, through a larger diameter D, the resonance frequency of the damper increases, whereas if the area of opening 116 is decreased, through a smaller diameter D, the resonance frequency of the damper decreases. Therefore, depending on the frequency one is trying to dampen, various elements on the damper can be modified to target one or more specific frequencies.

As for the frequencies being targeted by a dome damper structure, in premix style combustions systems, such as that shown in FIG. 1, high frequencies (screech) in the range of 1-10 kHz are typically of high concern. However, lower frequencies, in the range of 50-500 Hz can also be targeted. When targeting screech, or high frequencies, typical damper dimensions include a neck length L of approximately 5 mm-25 mm and a neck diameter D of approximately 5 mm-15 mm. When targeting lower frequencies, a typical neck length L is longer, on the order of approximately 20 mm-200 mm while the neck diameter D is approximately 10 mm-100 mm. As such, one way to express these geometric requirements is through a ratio of diameter D to neck length L, which for an embodiment of the present invention is approximately 0.2 to 2.0.

With respect to the purge holes 126, the equivalent area of all of the purge holes 126 define the total mass flow through the damper, and therefore, the velocity in the neck, which in turn defines the damping properties. The total area of the purge holes 126 is generally small compared to the area of the opening 116, or Aneck, such that the majority of the pressure drop across the damper is generated at the purge holes 126. For example, the total area of all of the purge holes 126 are approximately 10% or less than the Aneck (or area of the opening 116). For the embodiment depicted in FIGS. 1-9, and specifically referring to FIGS. 7-9, each of the damper bodies 120 have six purge holes 126. More purge holes 126 are typically required for higher velocity flow.

As discussed above, there are three major variables which can be adjusted to adjust the resonance frequency of the damper—area of the neck (hence diameter D), length of the neck (length L) and volume of the damper. However, as a practical point, not all of these variables can be changed once the hardware has been manufactured in the event during operation, it is determined that a different frequency of the combustor should be dampened. For example, it is difficult to change the size of the openings 116 and the length L of the openings on completed combustion systems. However, one such variable that can be modified is the volume of the damper. For the configuration depicted in FIGS. 2, 4, and 6-8, the damper volume 124 can be modified by way of a removable coverplate 122, or plug-like plate. The removable coverplate 122 is secured to damper body 120 by a removable fastener 128, such as a snap ring, clip, threaded body, or a bolt. This fastening mechanism provides an easy way to remove the coverplate 122 and replace it with a coverplate of a different size, resulting in a different damper volume 124. In order to ease the process of exchanging coverplates 122, each coverplate typically has a recess pocket 130 in which a tool can be placed to help remove the coverplate 122. Thereafter a new coverplate 122 can be put in place and then secured to one or more of the damper bodies 120.

Figure 2:
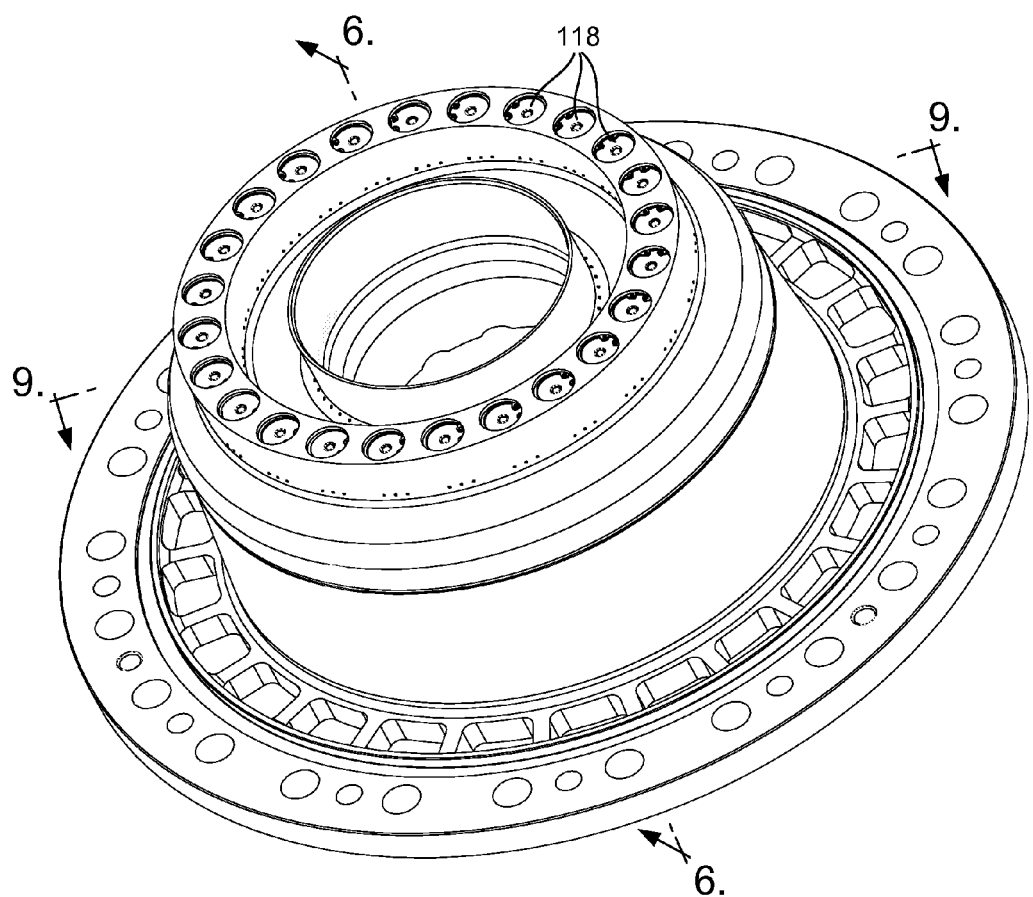
FIG. 2 is a perspective view of a portion of a gas turbine combustor in accordance with an embodiment of the present invention.
Figure 3:
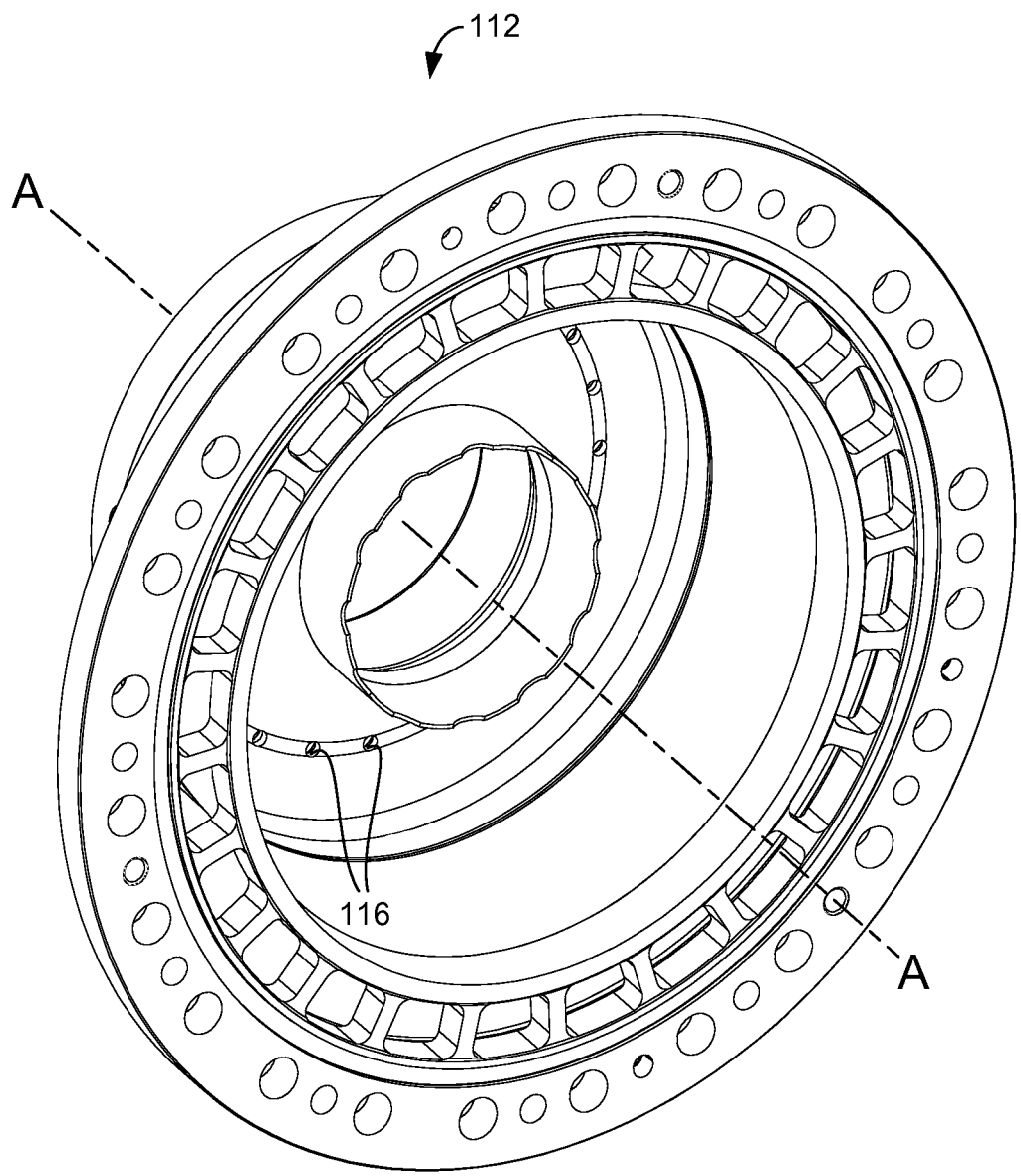
FIG. 3 is an alternate perspective of the portion of the gas turbine combustor of FIG. 2 in accordance with an embodiment of the present invention.
Figure 4:
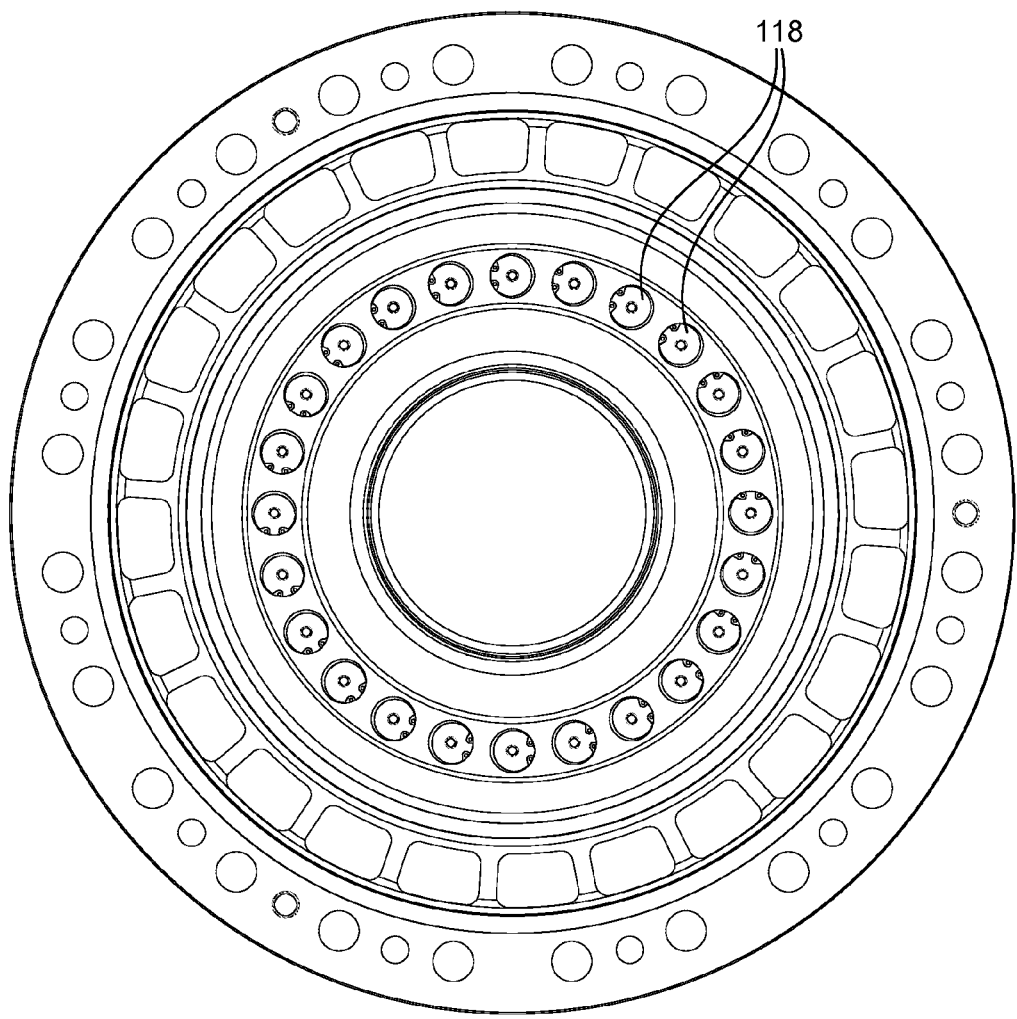
FIG. 4 is an end view of a portion of the gas turbine combustor of FIG. 2 in accordance with an embodiment of the present invention.
Figure 5:
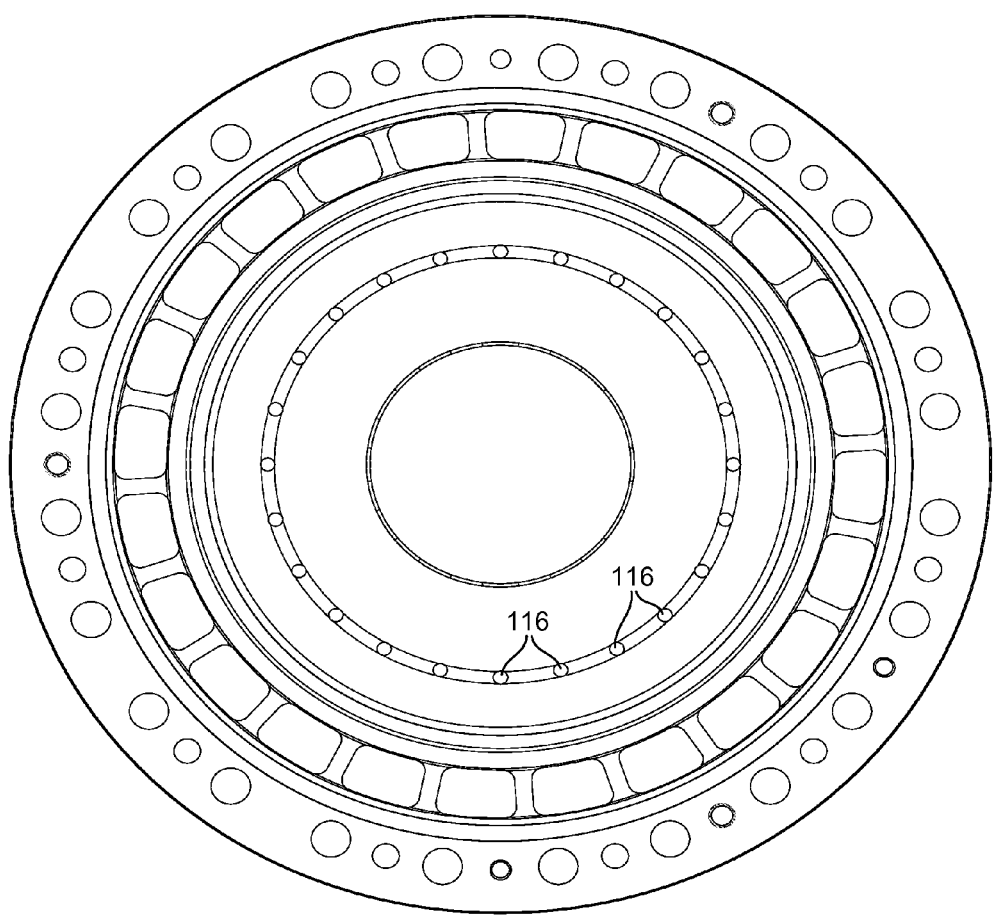
FIG. 5 is an opposing end view of the gas turbine combustor of FIG. 2 in accordance with an alternate embodiment of the present invention.
Figure 6:
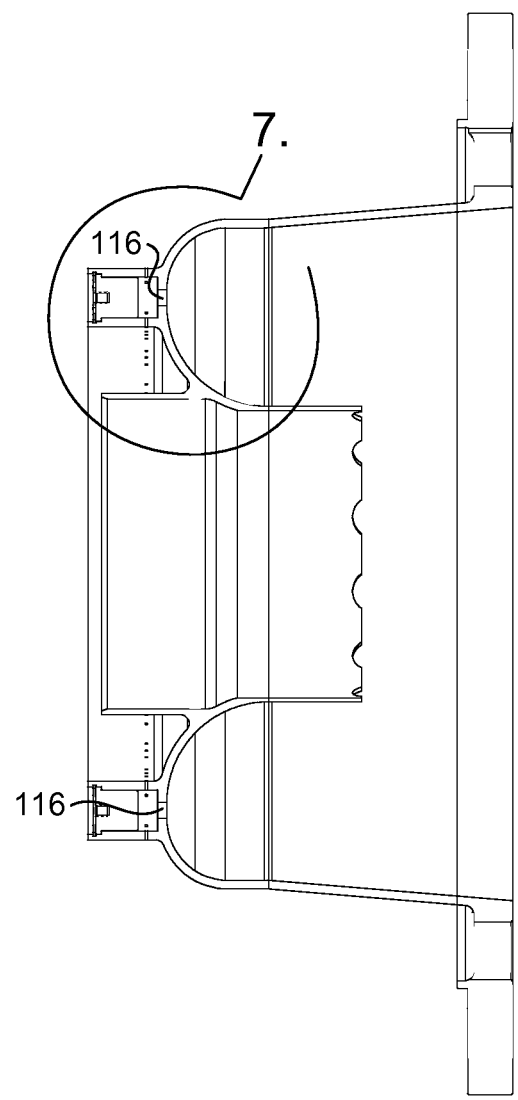
FIG. 6 is a cross section taken through the portion of the gas turbine combustor depicted in FIG. 2 in accordance with an embodiment of the present invention.
Figure 7:
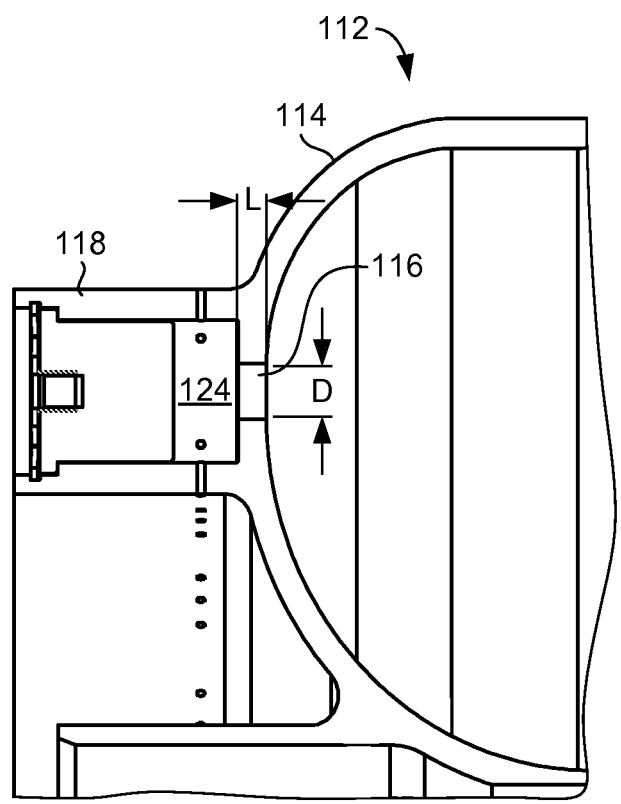
FIG. 7 is a detailed cross section view of a portion of the gas turbine combustor of FIG. 6 in accordance with an embodiment of the present invention.
Figure 14:
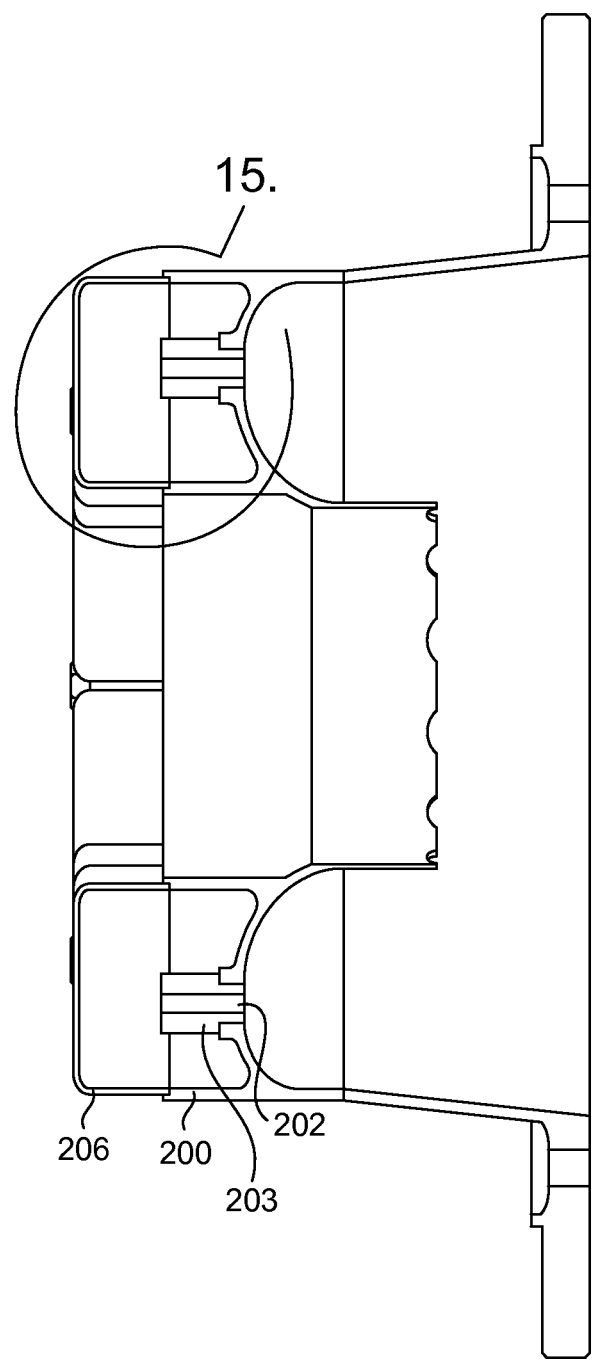
FIG. 14 is a cross section of the gas turbine combustor of FIG. 10 in accordance with an alternate embodiment of the present invention.
Figure 15:
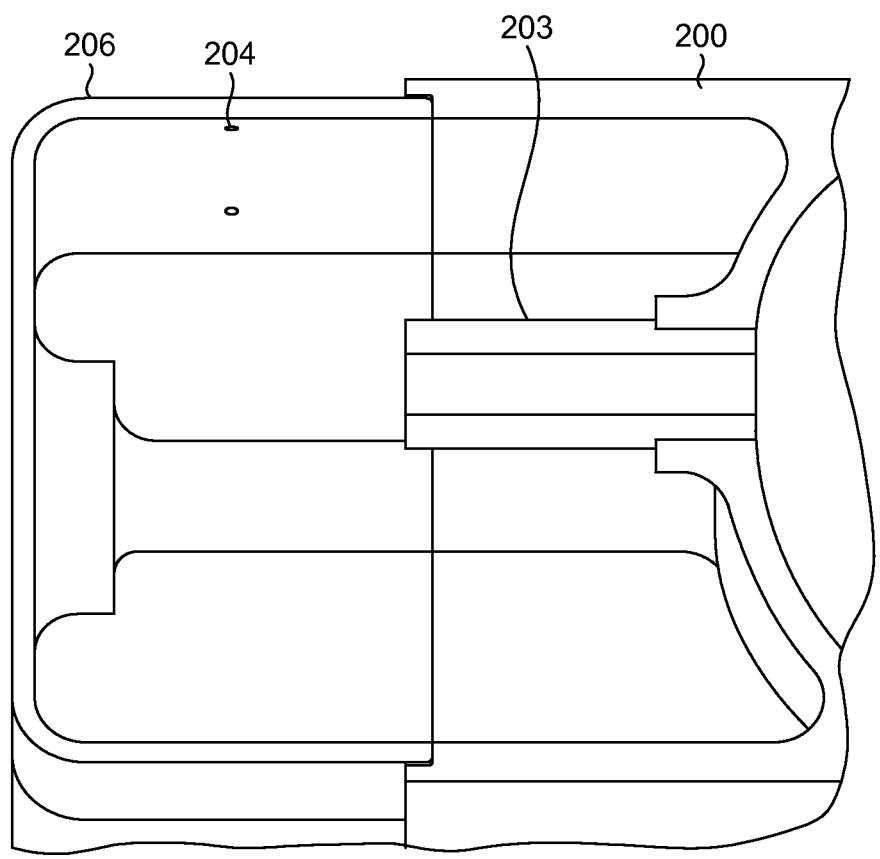
FIG. 15 is a detailed cross section view of a damper portion of the portion of the gas turbine combustor of FIG. 14 in accordance with an alternate embodiment of the present invention.

The damper bodies 120 shown in FIGS. 1-9 are generally cylindrical and oriented in an annular array about a center axis, as shown in FIGS. 2 and 4. However, dampers are not limited to the cylindrical configuration, and in fact, can take on generally any shape and quantity, as required. An alternate embodiment of the present invention is shown in detail in FIGS. 10-15. In this alternate embodiment of the present invention, one or more resonator boxes 200 are secured over the dome plate and opening 202. The size of opening 202 (diameter and neck length) is controlled by a threaded insert 203, as shown in FIGS. 14 and 15. The neck length and diameter may be controlled by a single threaded insert. The resonator boxes 200 provide a larger volume than the smaller cylindrical-shaped dampers as depicted in FIGS. 1-9. For the similar combustion system of FIGS. 1-9, instead of twenty-four cylindrical dampers, there are instead six resonator boxes employed. However, it is envisioned that the number of cylindrical dampers and resonator boxes may be modified to include fewer or additional dampers or boxes. Similar to the cylindrical damper bodies 120, the resonator boxes 200 also include purges holes 204 for supplying compressed air into the resonator box 200. As discussed above, the placement of purge holes 204 can also vary about the resonator 200 and/or the coverplate 206. Unlike the cylindrical damper body of the prior configuration, the coverplate 206 of the resonator box 200 is preferably fastened to the resonator box 200 by a means such as a bolt 208.

Similar to the cylindrical damper bodies, the three factors that can also change the resonator frequency of a resonator box 200 are the area of the neck (hence diameter D), length of the neck (length L) and volume of the resonator box. However, if during operation it is determined that a different frequency should be dampened, not all of these variables can be changed once the hardware has been manufactured. One variable that can be modified relatively easily, post-manufacturing, is the volume of the resonator box. The coverplate 206 can be removed and replaced with a different size coverplate that, due to its thickness, either increases or decreases the volume in the resonator box 200.

In an alternate embodiment of the present invention, various combinations of the damping mechanisms discussed above can be utilized together. For example, it is possible to employ a dome damper 118 positioned within a resonator box 200. Alternatively, it is possible to use the resonator box 200 with a simple opening in the dome (i.e. no separate damper body).

The damper bodies discussed above are depicted generally coaxial to the central axis A-A. However, the dome damper 118 and/or resonator box 200 can also be oriented at an angle relative to the central axis A-A. Where such damper bodies are angled, so are the corresponding openings 116 and 202. An angled opening allows for damper airflow interaction with the combustion flame while providing an indirect interaction with the anchoring flame.

In yet another embodiment of the present invention it is possible to target multiple critical frequencies in the combustion system through dampers configured to counteract more than one critical frequency. For example, a combustor can have a first set of dampers having a first opening diameter, area, volume and neck length directed towards targeting a first frequency, and a second set of dampers, having a second opening diameter, area, volume and neck length directed towards targeting a different frequency than the first set of dampers. The quantity of the first set of dampers and second set of dampers can vary as required.

In the embodiments discussed above, a basic geometry for the damper was a single volume with one neck length and effective area are disclosed. However, it is envisioned that more complex geometries for the damper bodies can be utilized in the present invention. For example, in another embodiment, multiple frequencies can be targeted by way of a damper body having multiple volumes arranged in an axial series, where a series of volumes and necks form a multi-volume damper.

As discussed above, without damper mechanisms in place on a premix combustor disclosed in FIG. 1, the operation of the premix combustor is limited. For example, for a combustion system similar to that of FIG. 1, normal combustion dynamics of 0.5 psi fluctuation could be tolerated by combustion hardware. By implementing a damper system disclosed herein, greater pressure fluctuations (increased combustion dynamics) can be tolerated, including pressure fluctuations upwards of approximately 1 psi. The damper system helps to reduce the adverse effects of the combustion dynamics by reducing the impact of critical vibration levels.

Yet another embodiment of the present invention is disclosed in FIGS. 16-25. As discussed above, the plurality of damper bodies 120 and resonator boxes 200 are mounted to the dome plate 114. However, the dome plate 114 has a curved surface, which can present difficulty when mounting this hardware. Furthermore, such combustor construction can also be quite costly to manufacture due to the complex geometries.

An additional feature that may be included in an embodiment of the present invention is an adaptor plate 300 which is positioned between the resonator box 200 or dome dampers 118 and the dome plate 114. The adapter plate 300 has the same general configuration and function, whether it is used in conjunction with a resonator box or a damper body—to provide an improved way of mounting and securing the dampers to the domeplate 114 of the combustor.

Referring to FIGS. 16-19, the adaptor plate 300 is shown with respect to the embodiment of the present invention featuring a plurality of individual dome dampers 118. The adapter plate 300 comprises a forward face 302 and an aft face 304 spaced a distance from the forward face 302 and parallel to the forward face 302. The adapter plate 300 is secured to the dome plate 114 by a plurality of fasteners or can be permanently fixed to the domeplate 114 by way of welding or brazing.

Figure 16:
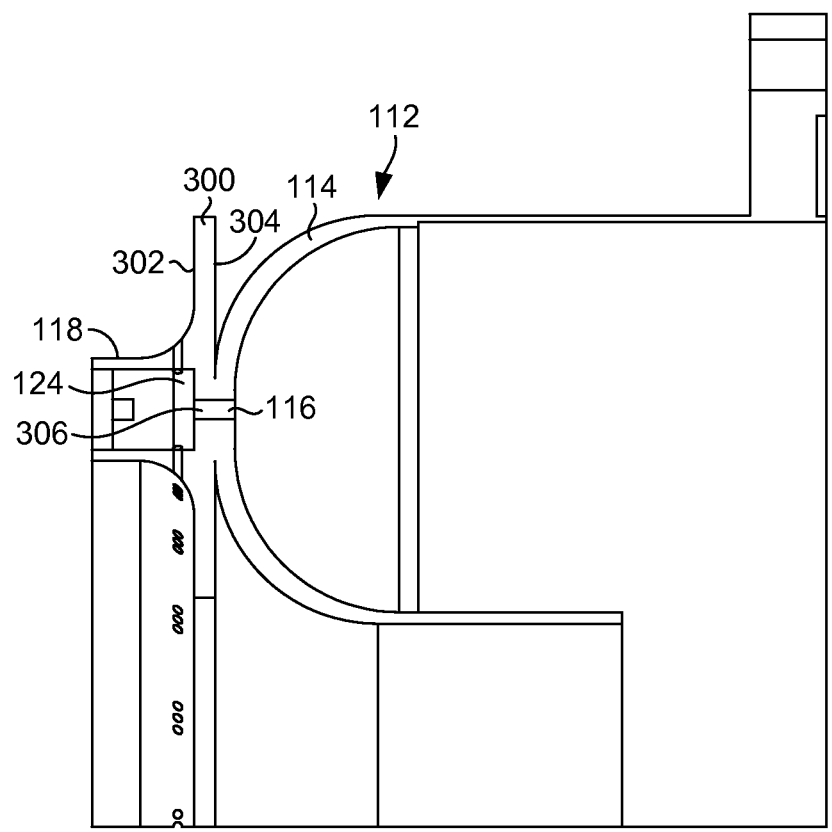
FIG. 16 is a detailed cross section view of a damper portion of the gas turbine combustor in accordance with yet another alternate embodiment.
Figure 17:
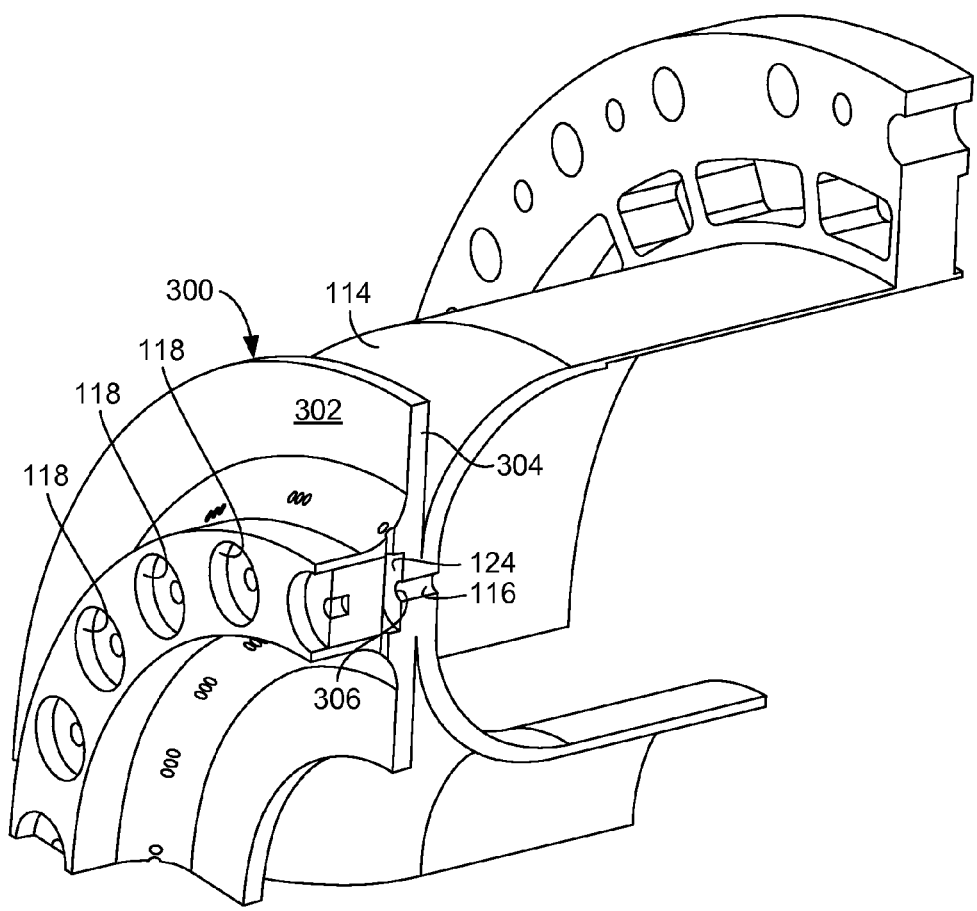
FIG. 17 is a partial perspective view of a damper portion and dome plate region of the gas turbine combustor of FIG. 16 in accordance with yet another alternate embodiment.
Figure 18:
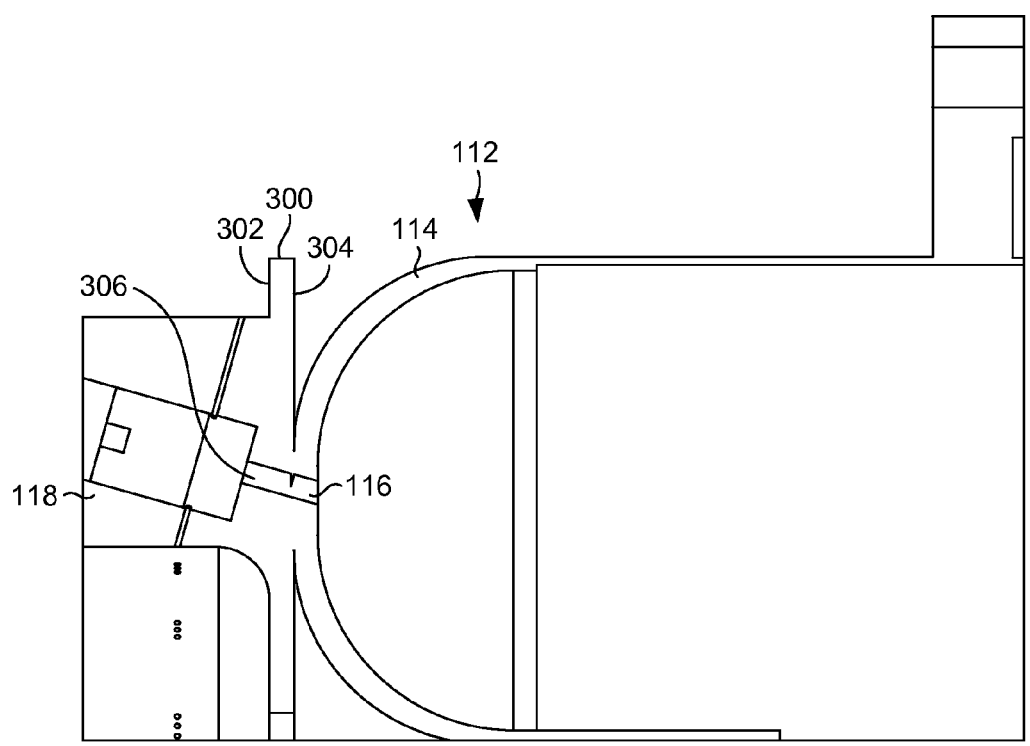
FIG. 18 is a detailed cross section view of a damper portion of the gas turbine combustor in accordance with an additional embodiment.
Figure 19:
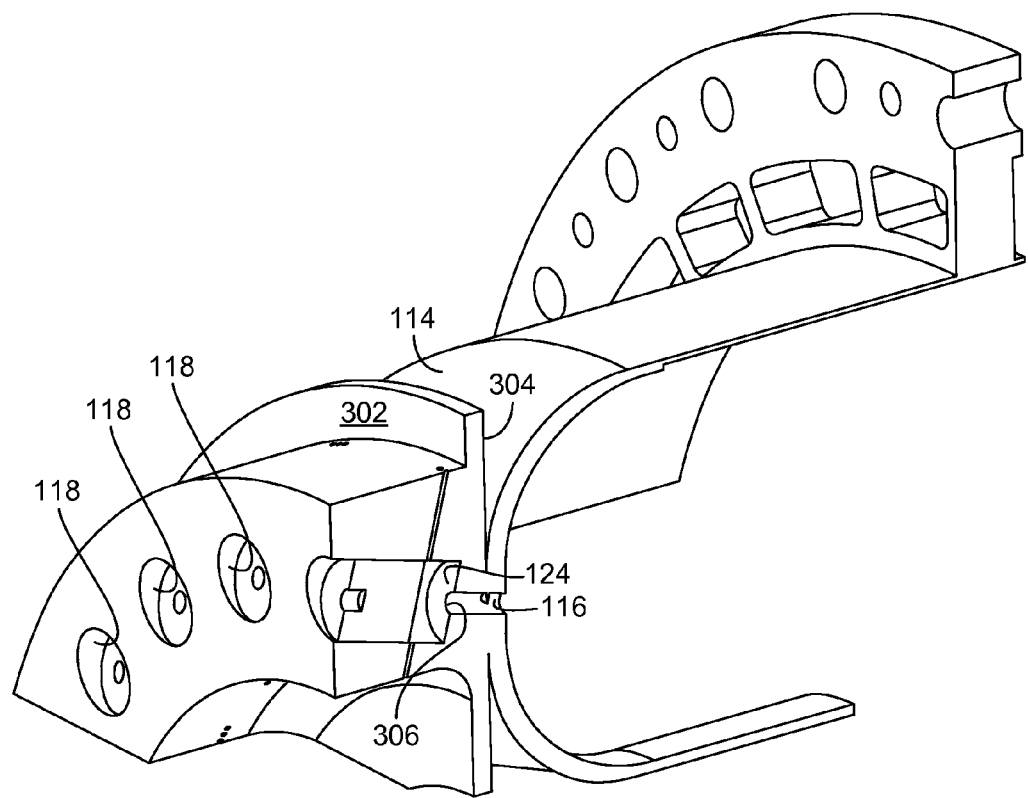
FIG. 19 is a partial perspective view of a damper portion and dome plate region of the gas turbine combustor of FIG. 18 in accordance with an additional embodiment.
Figure 20:
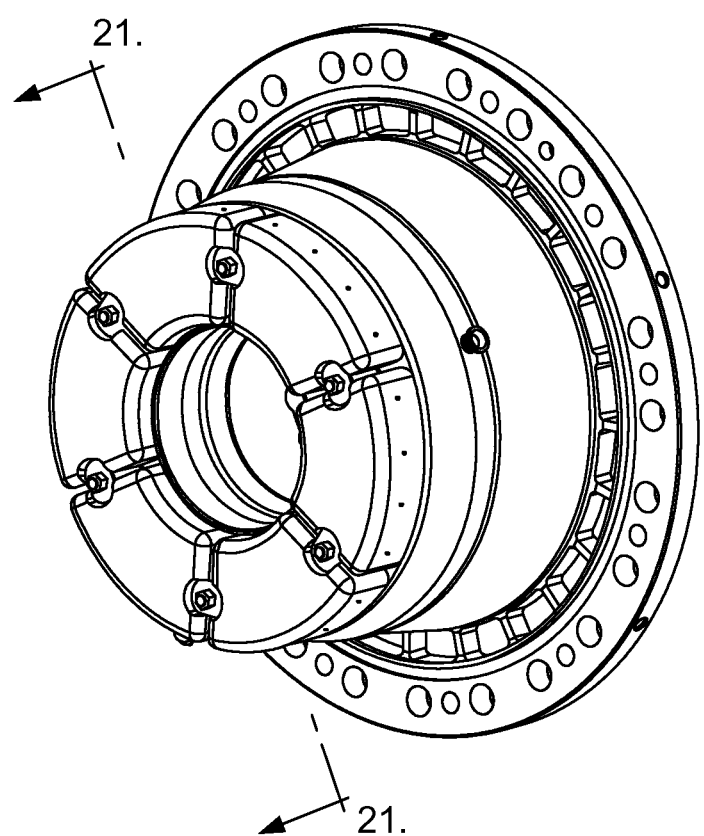
FIG. 20 is a perspective view of a portion of a gas turbine combustor in accordance with an alternate damper support configuration of the present invention.
Figure 21:
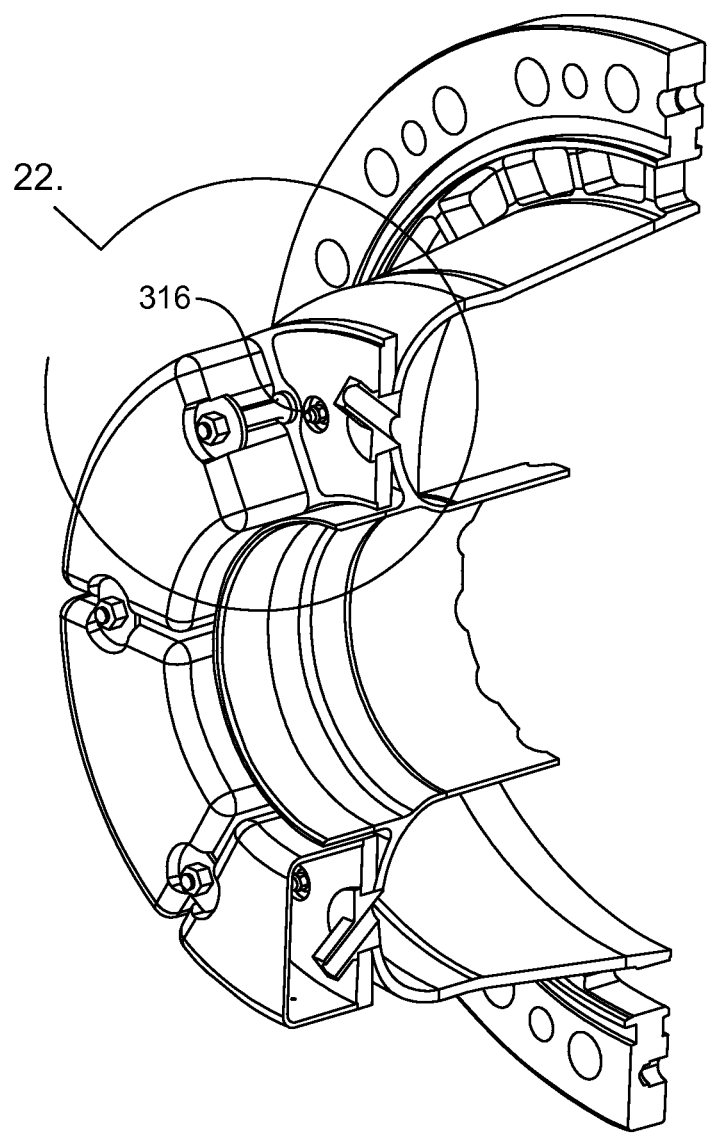
FIG. 21 is a perspective view of a portion of the gas turbine combustor configuration of FIG. 20.

The adapter plate 300 also comprises a first plurality of plate openings 306. These openings 306 correspond to the openings 116 in the domeplate 114 such that the damper volume 124 is in communication with the combustor volume inside the domeplate 114. Extending from the forward face 302 of the adapter plate 300 are a plurality of dome dampers 118. The dome dampers 118 can be integral to the adapter plate 300 or separately attached, such as through braze or welding, to the adapter plate 300. The dome dampers 118 can be mounted perpendicular to the adapter plate 300 as shown in FIGS. 16 and 17 or the dome dampers 118 can be mounted at an angle relative to the dome dampers 118, as shown in FIGS. 18 and 19.

Figure 24:
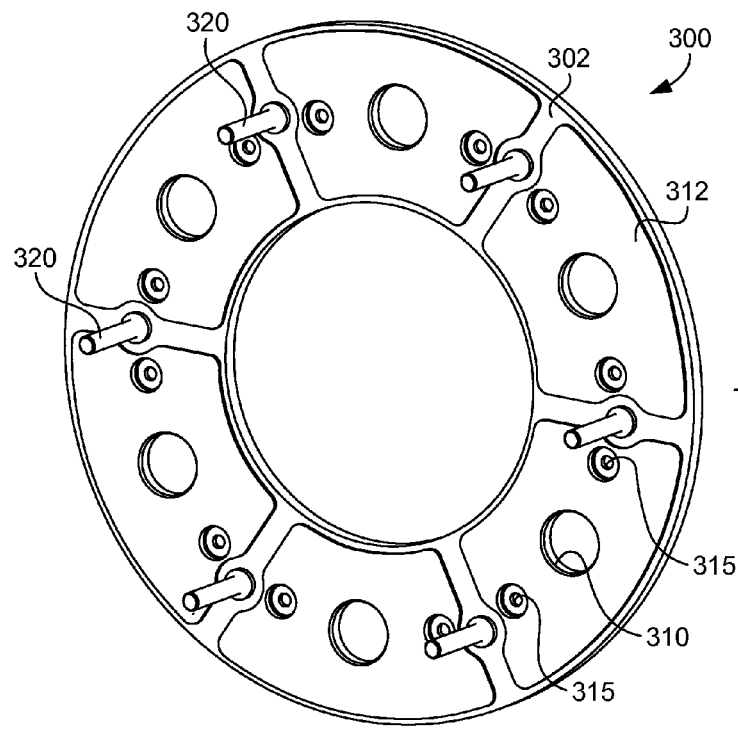
FIG. 24 is a perspective view of a forward face of an adapter plate in accordance with an embodiment of the present invention.
Figure 25:
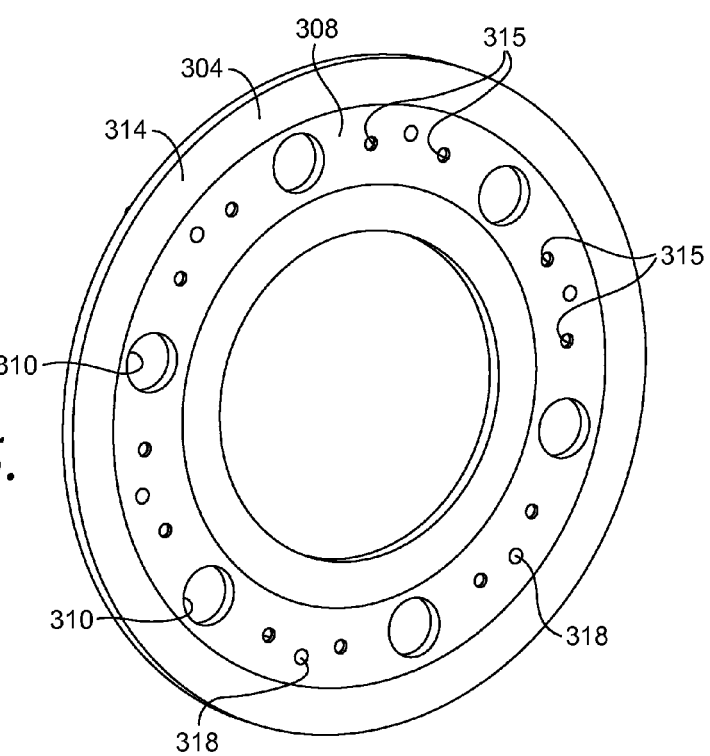
FIG. 25 is a perspective view of an aft face of the adapter plate of FIG. 24 in accordance with an embodiment of the present invention.

In another version of the present invention, the adapter plate 300 can take on a slightly different configuration as shown in FIGS. 24 and 25. More specifically, the adapter plate 300 has a front face 312 and an opposing aft face 314. The aft face 314 includes a contoured portion 308 that is sized and shaped to mate to the curved profile of the domeplate 114.

Figure 22:
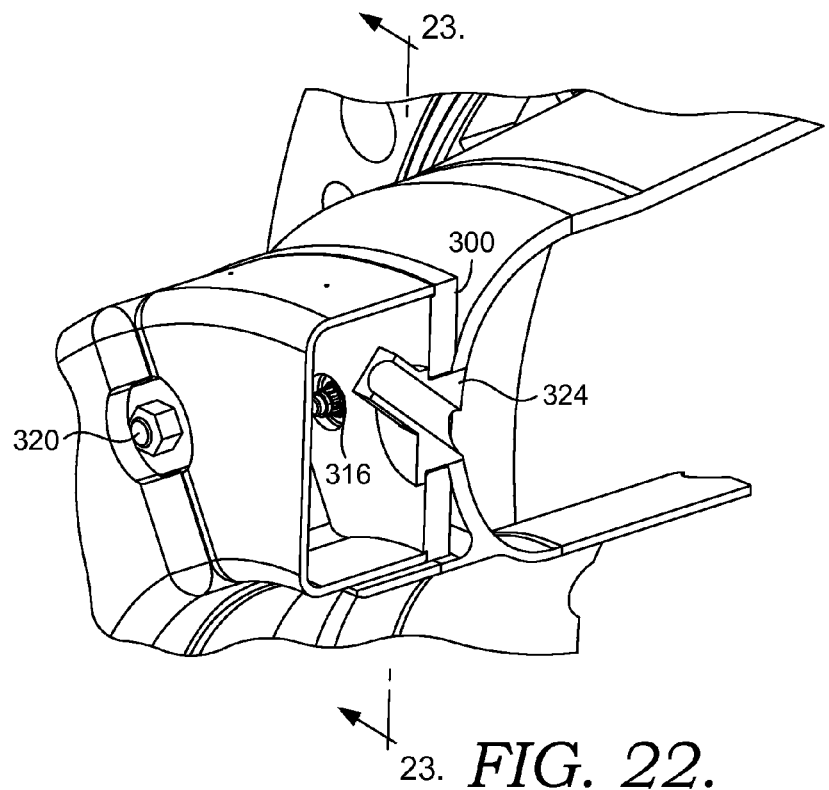
FIG. 22 is a detailed perspective view of the damper portion of the gas turbine combustor of FIG. 21.

The alternate version of the adapter plate 300 can be seen in use with an alternate dome damper configuration, the resonator box 200, as shown in FIGS. 20-23. Referring to FIGS. 20-23, a combustor dome assembly incorporating the resonator boxes 200, similar to that of FIGS. 10-15 is disclosed. However, for the embodiment shown in FIGS. 20-23, the resonator boxes 200 are mounted to the domeplate 114 through the adapter plate 300, previously discussed and shown in FIGS. 24 and 25. More specifically, the adapter plate 300 shown in FIGS. 24 and 25 includes a first plurality of plate openings 310 through which the damper bodies/volume communicates with the combustor. The adapter plate 300 also includes a second plurality of plate openings 315. The adapter plate 300 also includes a third plurality of openings 318 spaced in an annular array about the adapter plate 300. The third plurality of openings 318 each include a fastener 320 secured to the adapter plate 300, where the fastener 320 is used to secured the one or more resonator boxes 200 to the adaptor plate 300, as shown in FIG. 22.

Figure 23:
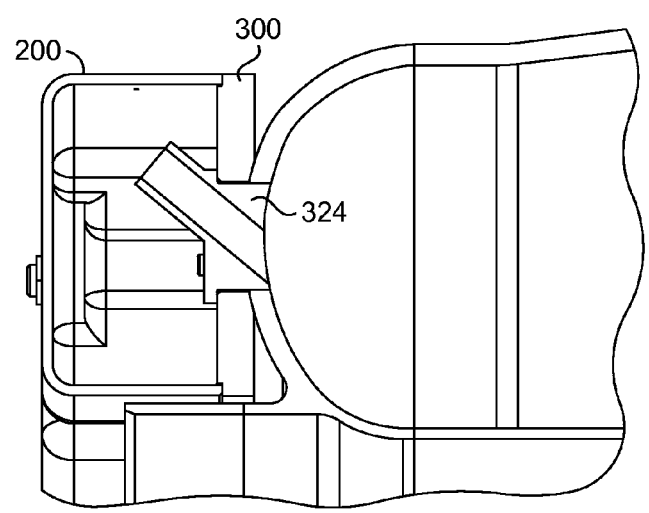
FIG. 23 is a cross section view of the damper portion of the gas turbine combustor of FIG. 21.

The dome dampers 324 can extend generally perpendicular to the adapter plate 300. Alternatively, and as shown in FIGS. 22 and 23, the dome dampers 324 can also be oriented at an angle relative to the adapter plate 300. Whether resonator boxes 200 or dome dampers 118 are being used, the adaptor plate 300 provides an improved way of securing and locating damper configurations to the domeplate 114.

Figure 26:
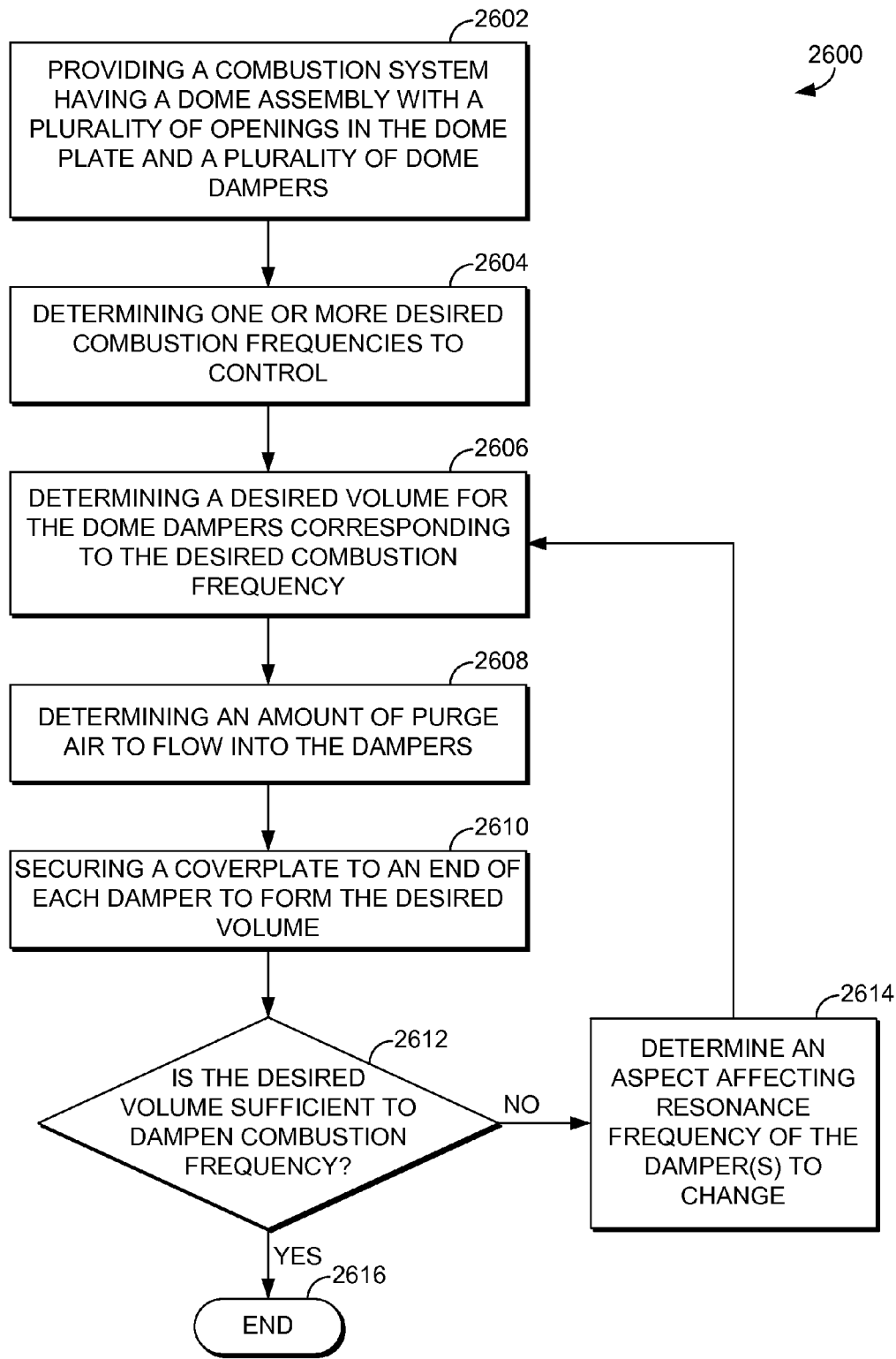
FIG. 26 is a flow diagram outlining a method of regulating combustor dynamics in accordance with yet another embodiment of the present invention.

Referring to FIG. 26, an alternate embodiment of the present invention discloses a method 2600 of regulating combustion dynamics in a gas turbine combustor. In a step 2602, a combustion system is provided having a combustor dome assembly comprising a dome plate with a plurality of openings in the dome plate, where each of the openings has a diameter and neck length. The combustion system also includes a plurality of dome dampers encompassing respective openings in the dome plate. In a step 2604, one or more desired combustion frequencies to control is determined. As discussed above, the frequency to be controlled can be a high frequency, such as screech, or a lower frequency. In a step 2606 a desired volume for the dome dampers necessary to target the one or more frequencies identified in step 2604 is determined. Then, in a step 2608, a desired amount of purge air to flow into the dome dampers is determined. In a step 2610, a coverplate is secured to at least an end of the dome dampers where the coverplate is placed in a position to form the desired volume for the dampers determined in step 2606. Then, in a step 2612, a determination is made as to whether the desired volume of each damper determined in step 2606 is sufficient to alter the combustor frequency. Such a determination is typically made as a result of operating the combustion system. If the determination is made that the damper volume is insufficient, then in a step 2614, one or more variables affecting the resonance frequency of the damper, such as neck length, opening diameter or damper volume are determined to be changed and the process returns to step 2606 to determine the desired damper volume. If a determination is made at step 2612 that the desired damper volume is sufficient to dampen the desired combustion frequency, then the process ends at a step 2616.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A dome assembly for a gas turbine combustion system comprising:
   a dome plate having a generally hemispherical cross section, the dome plate encompassing an inlet to a combustion liner with a concave surface of the dome plate facing the inlet to the combustion liner and an opposing convex surface of the dome plate facing away from the combustion liner;
   a plurality of openings in the dome plate where each opening has a diameter and a neck length, the neck length defining a longitudinal axis, the longitudinal axis being oriented on the dome plate so as to be parallel with a central axis of the gas turbine combustion system;
   a plurality of dome dampers disposed at a crest of the hemispherical cross section of the dome plate and extending away from the convex surface of the dome plate and positioned externally of the inlet to and upstream of the combustion liner, each of the dome dampers encompassing a respective opening in the dome plate and comprising:
      a damper body having a cavity located therein;
      a coverplate secured to at least an end of the damper body to form a damper volume; the coverplate being removably secured to the damper body by one of the group consisting of a snap ring, a clip, a threaded body, and a holt; and
      a plurality of purge holes located about the damper body.

2. The dome assembly of claim 1, wherein the dome dampers are oriented in an annular array about the central axis.

3. The dome assembly of claim 1, wherein the damper body is substantially cylindrical in cross section.

4. The dome assembly of claim 3, wherein the purge holes are located about a circumference of the cylindrical body or in the coverplate.

5. The dome assembly of claim 1, wherein the damper body consists of a resonator box.

6. The dome assembly of claim 5, wherein the coverplate of the resonator box is bolted to the dome assembly.

7. The dome assembly of claim 1, wherein the diameter to neck length ratio ranges from 0.2 to 2.0.

8. The dome assembly of claim 1, wherein the dome dampers are capable of controlling both high and low frequencies.

9. The dome assembly of claim 1, wherein the dome dampers have different damper volumes.

10. A gas turbine combustion system comprising
   a substantially cylindrical combustion liner having a central axis and located coaxial to and radially within a flow sleeve, the combustion liner having an inlet end and an opposing outlet end;
   a set of main fuel injectors positioned radially outward of the combustion liner and proximate an upstream end of the flow sleeve;
   a combustor dome assembly encompassing the inlet end of the combustion liner and extending from proximate the set of main fuel injectors to a dome plate having a substantially hemispherical-shaped cross section, the dome plate positioned a distance forward of the inlet end of the combustion liner and turning to extend a distance into the combustion liner, the dome plate including a concave surface facing the inlet to the combustion liner and an opposing convex surface facing away from the combustion liner, the combustor dome assembly comprising:
      a plurality of openings in the dome plate with each of the openings having a diameter and a neck length, the neck length defining a longitudinal axis, the longitudinal axis being oriented on the dome plate so as to be parallel with the central axis of the combustion liner;
      a plurality of dome dampers disposed at a crest of the hemispherical-shaped cross section of the dome plate and extending away from the convex surface of the dome plate, and positioned externally of the inlet to and upstream of the combustion liner, each of the dome dampers encompassing a respective opening in the dome plate and comprising:
         a damper body having a cavity located therein;
         a plug removably received within the cavity of the damper body to form a damper volume, the plug being removably secured to the damper body by one of the group consisting of snap ring, a clip, a threaded body, and a holt; and
a plurality of purge holes located about the damper body.

11. The dome assembly of claim 10, wherein the damper body is generally cylindrical in cross section.

12. The dome assembly of claim 10, wherein the damper body comprises a resonator box.

13. The dome assembly of claim 10, wherein the dome dampers are oriented in an annular array about the central axis.

14. The dome assembly of claim 10, wherein the diameter to neck length ratio ranges from 0.2 to 2.0.

15. A method of regulating combustion dynamics in a gas turbine combustor comprising:
providing a combustion system having a combustor dome assembly having a substantially hemispherically shaped dome plate with a plurality of openings in the dome plate, the dome plate having a concave surface facing the inlet to the combustion liner and an opposing convex surface facing away from the combustion liner, the plurality of openings having a diameter and a neck length, the neck length defining a longitudinal axis, the longitudinal axis being oriented on the dome plate so as to be parallel with a central axis of the combustion system, and a plurality of dome dampers disposed at a crest of the hemispherically shaped dome plate and encompassing respective openings in the substantially hemispherically shaped dome plate; the plurality of dome dampers extending away from the convex surface of the dome plate, and positioned externally of the inlet to and upstream of the combustion liner;
determining one or more desired combustion frequencies to control;
determining a desired volume for the plurality of dome dampers to obtain the one or more desired combustion frequencies;
determining a desired purge air flow to pass into the plurality of dome dampers; and
remobably securing a coverplate to at least an end of each dome damper to form the desired volume within each of the dome dampers, the desired volume providing a sufficient volume to adequately dampen pressure fluctuations within the combustion system, the coverplate being removably secured to the damper body by one of the group consisting of a snap ring, a clip, a threaded body, and a bolt.

16. The method of claim 15 further comprising determining whether the desired volume of each of the dome dampers is sufficient and, where upon a determination that the volume of the dome dampers is insufficient, one or more of the neck length, the diameter, or the desired volume is altered.

17. The method of claim 15, wherein the desired volume for the plurality of dome dampers comprises two or more volumes of different sizes so as to control two or more corresponding combustion frequencies.

* * * * *